(12) United States Patent
McEvoy et al.

(10) Patent No.: US 9,909,386 B2
(45) Date of Patent: Mar. 6, 2018

(54) SELECTOR VALVE FOR HIGH PRESSURE HYDROCARBON PRODUCTION OPERATIONS

(71) Applicant: GE Oil & Gas Pressure Control LP, Houston, TX (US)

(72) Inventors: Travis Kyle McEvoy, Houston, TX (US); Lloyd Ray Cheatham, Lake Jackson, TX (US); Ben Calvin Holgate, Pearland, TX (US); Christopher Dibernardo, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 349 days.

(21) Appl. No.: 14/660,070

(22) Filed: Mar. 17, 2015

(65) Prior Publication Data
US 2015/0267505 A1  Sep. 24, 2015

Related U.S. Application Data

(60) Provisional application No. 61/955,672, filed on Mar. 19, 2014.

(51) Int. Cl.
*E21B 34/02* (2006.01)
*F16K 11/085* (2006.01)

(52) U.S. Cl.
CPC ............ *E21B 34/02* (2013.01); *F16K 11/085* (2013.01)

(58) Field of Classification Search
None
See application file for complete search history.

(56) References Cited

U.S. PATENT DOCUMENTS

| 2,621,886 A | | 12/1952 | Mueller | |
|---|---|---|---|---|
| 3,545,474 A | * | 12/1970 | Brown | E21B 23/002 137/865 |
| 3,545,489 A | * | 12/1970 | Brown | E21B 23/002 137/876 |
| 3,720,233 A | | 3/1973 | Shur et al. | |
| 3,771,765 A | * | 11/1973 | Scapes | F16K 5/0214 137/625.47 |

(Continued)

OTHER PUBLICATIONS

International Search Report and Written Opinion issued in connection with corresponding PCT Application No. PCT/US2015/021399 dated Dec. 7, 2015.

*Primary Examiner* — Shane Bomar
(74) *Attorney, Agent, or Firm* — Hogan Lovells US LLP

(57) ABSTRACT

An apparatus for directing a fluid from an inlet to one of a plurality of outlets that are associated with a wellhead assembly includes a block body having a block inlet and a plurality of block outlets. A selector plug is located within the block body, the selector plug having a plug inlet aligned with the block inlet along a central axis, a plug outlet at an angle relative to the central axis, and a plug bore extending from the plug inlet to the plug outlet. A stem member is moveable to selectively rotate the selector plug within the block body so that the plug outlet aligns with one of the plurality of block outlets, providing a fluid flow path from the block inlet to such one of the plurality of block outlets, and impeding fluid communication from the block inlet to the others of the plurality of block outlets.

20 Claims, 5 Drawing Sheets

(56) References Cited

U.S. PATENT DOCUMENTS

| | | | | |
|---|---|---|---|---|
| 4,270,611 | A * | 6/1981 | Arnaudeau | B63B 22/021 |
| | | | | 141/387 |
| 4,566,494 | A * | 1/1986 | Roche | E21B 21/001 |
| | | | | 137/625.46 |
| 6,056,001 | A | 5/2000 | Boyles et al. | |
| 8,360,391 | B2 * | 1/2013 | Morris | F16K 3/262 |
| | | | | 251/111 |
| 2004/0135112 | A1 * | 7/2004 | Greeb | E21B 34/02 |
| | | | | 251/214 |
| 2005/0006150 | A1 * | 1/2005 | Sims | E21B 21/06 |
| | | | | 175/209 |
| 2005/0236049 | A1 * | 10/2005 | Manson | F16K 11/072 |
| | | | | 137/625.11 |
| 2016/0097251 | A1 * | 4/2016 | Cheatham | E21B 33/068 |
| | | | | 166/379 |

\* cited by examiner

SELECTOR VALVE FOR HIGH PRESSURE HYDROCARBON PRODUCTION OPERATIONS

CROSS REFERENCE TO RELATED APPLICATION

This application claims priority to and the benefit of co-pending U.S. Provisional Application Ser. No. 61/955,672 filed Mar. 19, 2014, titled "Selector Valve," the full disclosure of which is hereby incorporated herein by reference in its entirety for all purposes.

BACKGROUND

1. Field of Disclosure

This invention relates in general to valves, and in particular to valves with a single inlet and multiple outlets for use in high pressure operating environments of hydrocarbon production operations.

2. Description of Related Art

Systems for developing hydrocarbon reserves might use hydraulic fracturing to optimize the development of the resource. In traditional hydraulic fracturing operations using fracturing manifolds, a series of skids can be included that contain a number of flow lines and valves that are opened or closed to direct the hydraulic fracturing fluids to the correct well. The number of flow lines and valves required can result in a large and complex skid of equipment.

Certain of the valves that are part of the hydraulic fracturing system can be subject to high pressure fluids in the closed position, to block the flow of fluids to a particular well. The exposure to high pressures while in the closed position can have a detrimental effect on the useful life of such valves.

SUMMARY OF THE DISCLOSURE

Embodiments of the current disclosure provide multi-bore fluid hubs that allow a single point of connection to a fluid supply source and multiple points of connection to fluid outlets, and can provide fluid flow control and shut down capabilities. Multi-bore fluid hubs can significantly decrease the number of valves needed to select one of a number of fluid paths, compared to traditional valve configurations required to perform a similar function. Reducing the number of valves decreases maintenance requirements, as well as the footprint and the weight of the required equipment. Systems and methods of this disclosure provide the use of a multi-bore fluid hub that allows hydraulic fracturing operations to be run in one of the wells in parallel with other operations on the other wells without disconnecting the fracturing equipment.

In an embodiment of this disclosure, an apparatus for directing a fluid from an inlet to one of a plurality of outlets that are associated with a wellhead assembly includes a block body, the block body having a block inlet and a plurality of block outlets. A selector plug is located within the block body. The selector plug has a plug inlet aligned with the block inlet along a central axis, a plug outlet, and a plug bore extending from the plug inlet to the plug outlet. The plug outlet is at an angle relative to the central axis. A stem member is coupled to the selector plug, the stem member being moveable to selectively rotate the selector plug within the block body so that the plug outlet aligns with one of the plurality of block outlets, providing a fluid flow path from the block inlet to such one of the plurality of block outlets, and impeding fluid communication from the block inlet to the others of the plurality of block outlets.

In an alternate embodiment of this disclosure, an apparatus for directing a fluid from an inlet to one of a plurality of outlets that are associated with a wellhead assembly includes a block body having a central cavity and a sidewall. The block body also has a plurality of block outlets extending from the central cavity through the sidewall, and a block inlet extending to the central cavity. A selector plug is located within the central cavity, the selector plug having a plug inlet aligned with the block inlet along a central axis, a plug outlet, and a plug bore extending from the plug inlet to the plug outlet. The selector plug is rotatable within the central cavity so that the plug outlet aligns with one of the plurality of block outlets. When the fluid flows from the plug inlet to the one of the plurality of block outlets, the selector plug is rotationally restricted relative to the block body.

In yet another alternate embodiment of this disclosure, a method for directing a fluid from an inlet to one of a plurality of outlets that are associated with a wellhead assembly includes locating a selector plug within a block body of a selector valve. The block body has a block inlet and a plurality of block outlets and the selector plug has a plug inlet aligned with the block inlet, a plug outlet, and a plug bore extending from the plug inlet to the plug outlet. The plug outlet is at an angle relative to the plug inlet. A stem member coupled to the selector plug can be rotated to rotate the selector plug within the block body so that the plug outlet aligns with one of the plurality of block outlets, providing a fluid flow path from the block inlet to such one of the plurality of block outlets, and impeding fluid communication from the block inlet to the others of the plurality of block outlets.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE DISCLOSURE

Figure 1:
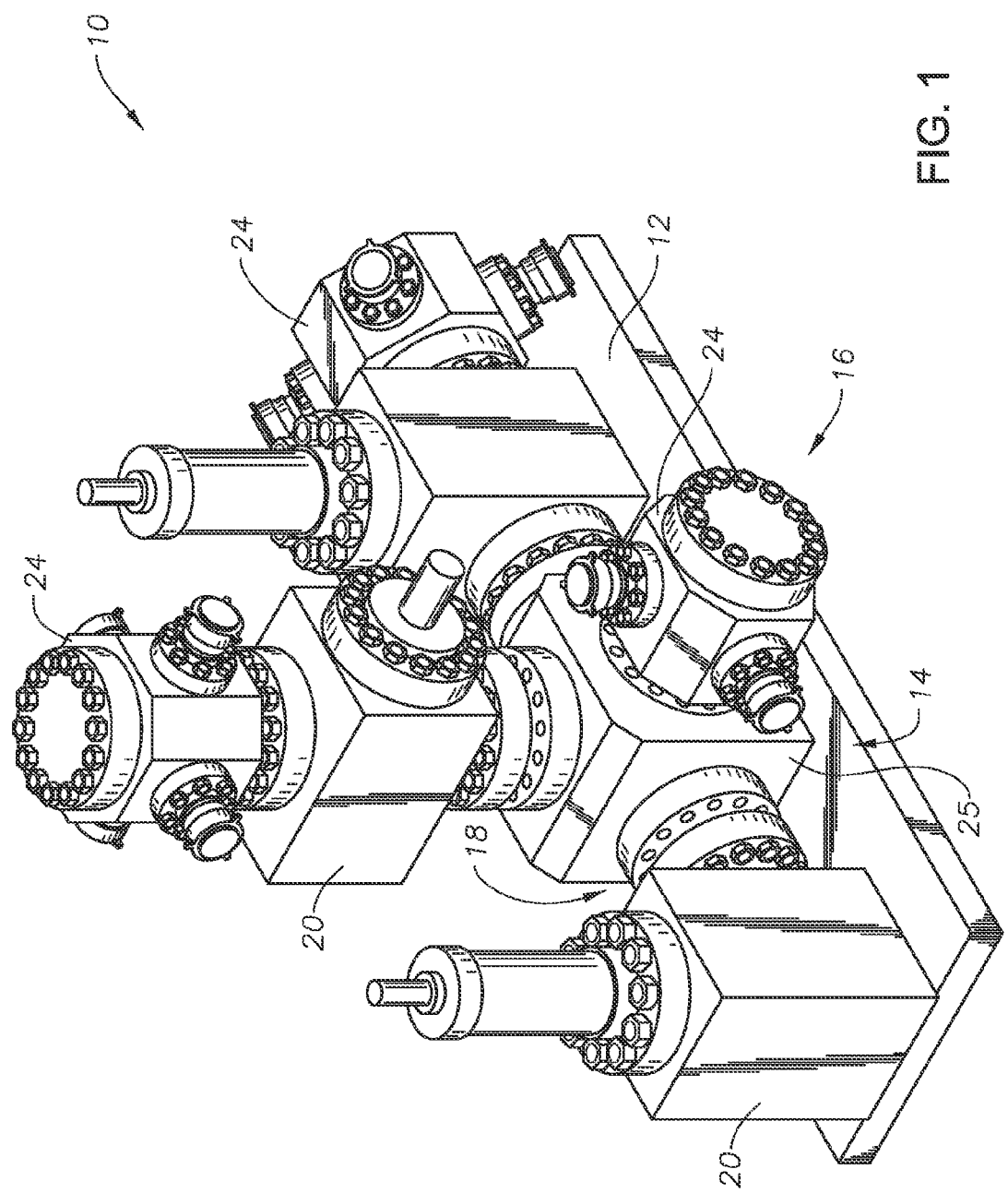
FIG. 1 is a perspective view of a selector valve with valves in communication with the outlets in accordance with an embodiment of this disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 2:
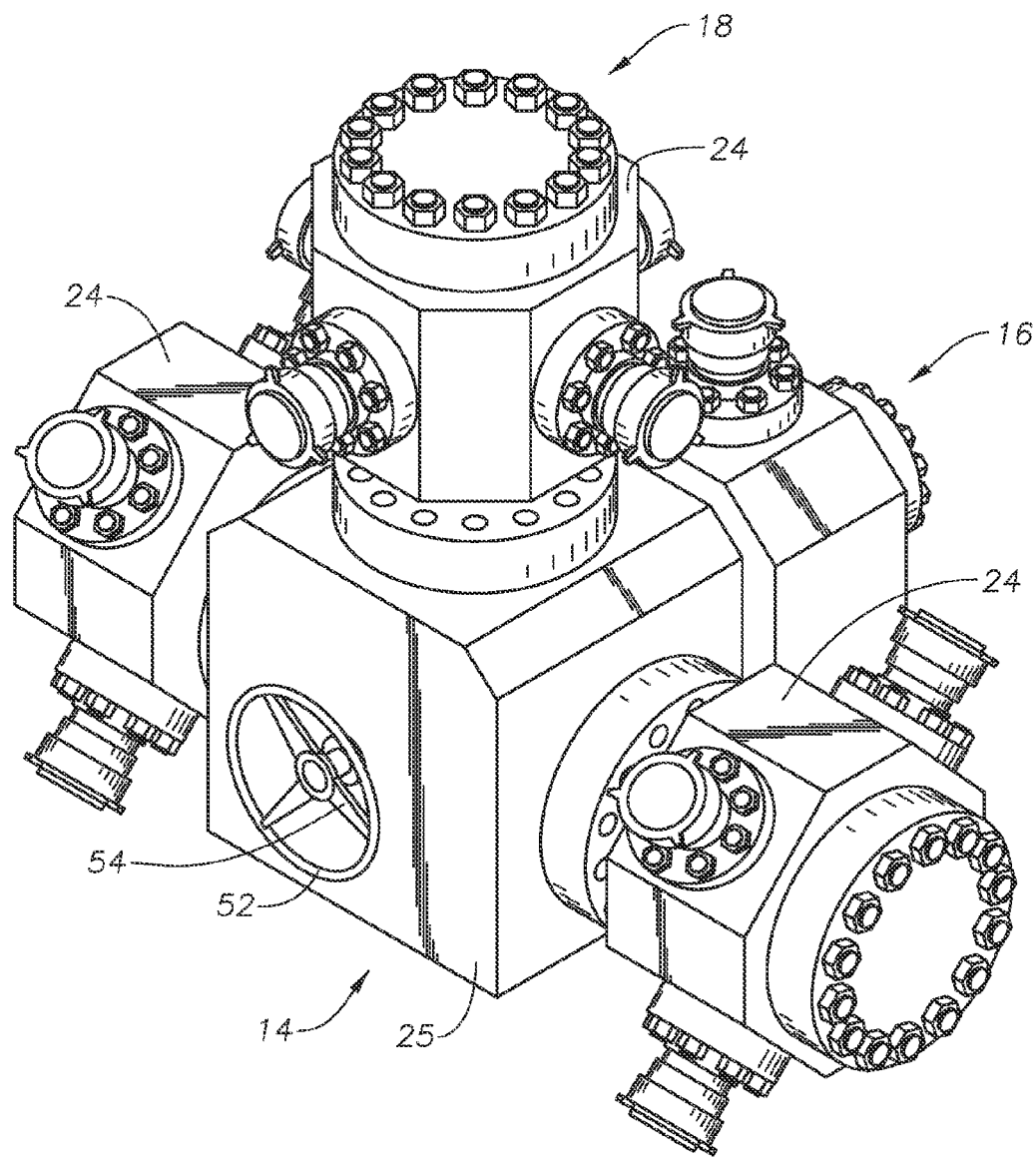
FIG. 2 is a perspective view of a selector valve in accordance with an embodiment of this disclosure.

As can be seen in FIGS. 1, hydraulic fracturing system 10 can be located on skid 12. Hydraulic fracturing system can include selector valve 14. Selector valve 14 of the example embodiments of FIGS. 1-2 are shown with a selector valve source 16 and three selector valve exits 18. In alternate embodiments, there can be two valve exits 18 or more than three selector valve exits. Fluids, such as hydraulic fracturing fluids or chemical treatments, can flow into selector valve 14 by way of selector valve source 16 and can be directed out of selector valve 14 through one of the selector valve exits 18. Selector valve source 16 can be in fluid communication with a fluid pumping system. Each of the selector valve exits 18 can correspond to, and be in fluid communication with, wellhead assembly that is located over a subterranean well.

Figure 3:
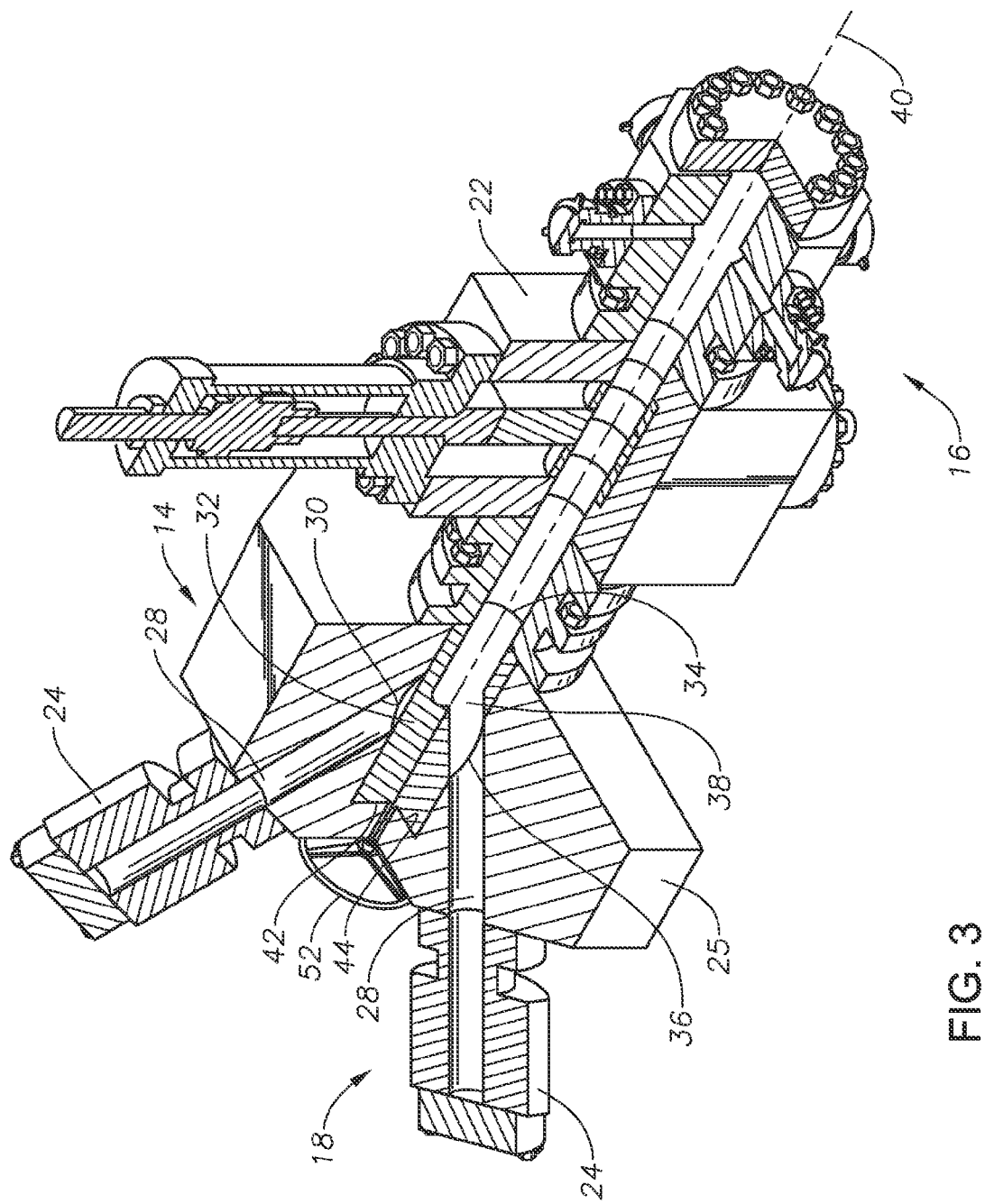
FIG. 3 is a quarter sectional view of a selector valve with a valve in communication with the inlet in accordance with an alternative embodiment of this disclosure.
Figure 4:
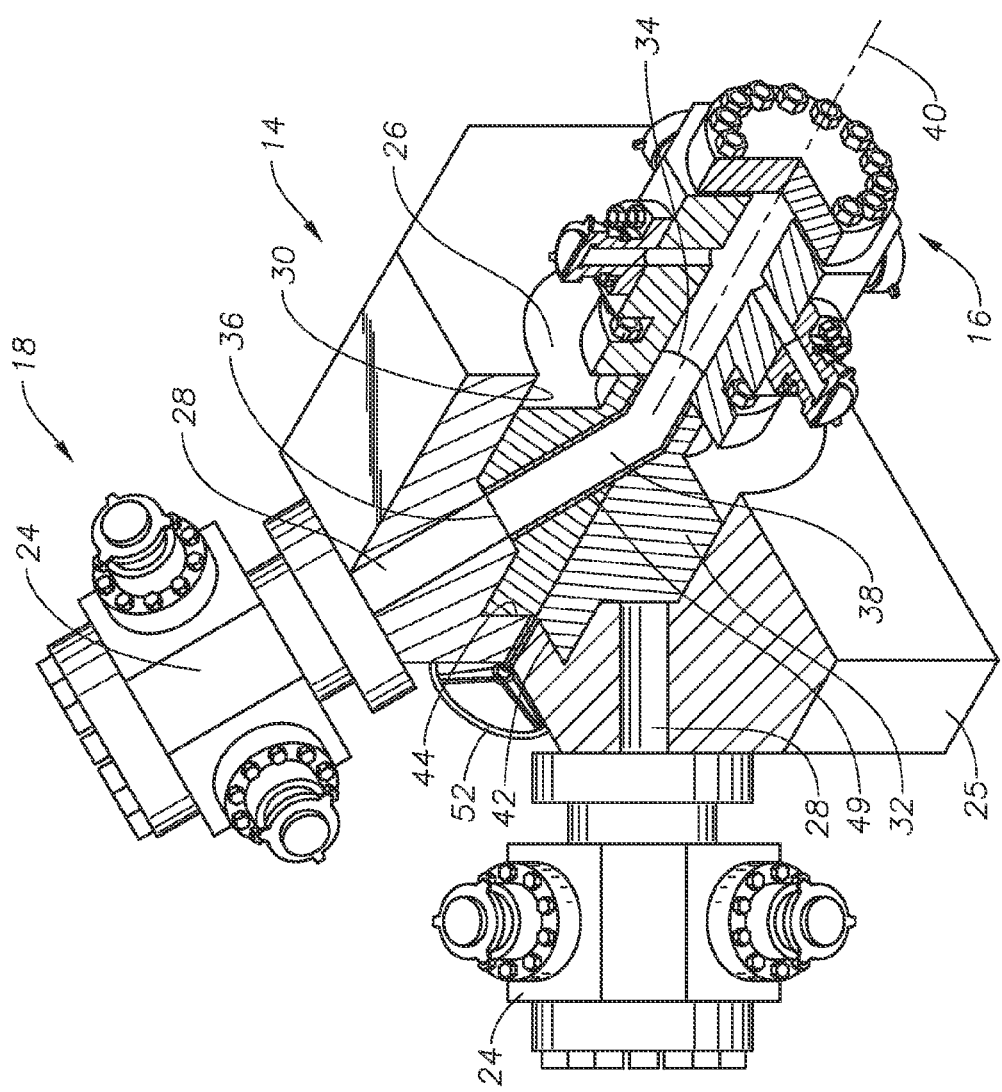
FIG. 4 is a quarter sectional view of a selector valve in accordance with an alternative embodiment of this disclosure.

In the example embodiment of FIG. 1, an outlet valve 20 is associated with each selector valve exit 18. Outlet valve 20 can be a gate valve or other known type of valve that can move between an open position and a closed position. In the closed position, outlet valve 20 blocks fluids from exiting hydraulic fracturing system 10 and reaching the subterranean well associated with such selector valve exit 18. Looking at FIG. 3, inlet valve 22 can be associated with selector valve source 16. Inlet valve 22 can be a gate valve or other known type of valve that can move between an open position, as shown, and a closed position. In the closed position, inlet valve 22 blocks fluids from entering hydraulic fracturing system 10. Inlet valve 22 and outlet valve 20 can provide a separate means for controlling the fluids flowing into and out of hydraulic fracturing system 10. In alternate embodiments, such as shown in FIGS. 2 and 4, no inlet valve 22 or outlet valve 20 may be included and selector valve 14 can by itself control the fluids flowing into and out of hydraulic fracturing system 10. In other alternate embodiments, hydraulic fracturing system 10 can include both inlet valve 22 or outlet valve 20.

Looking again at FIG. 1, fracturing (frac) head 24, such as a goathead, can be associated with one or more selector valve exit 18 for fluidly connecting such selector valve exit 18 to the subterranean well. A frac head 24 can also be associated with selector valve source 16. Frac head 24 can be connected directly to selector valve source 16 or selector valve exit 18, or can be connected to an outlet valve 20 or inlet valve 22, which in turn is connected to selector valve source 16 or selector valve exit 18, respectively.

Figure 5:
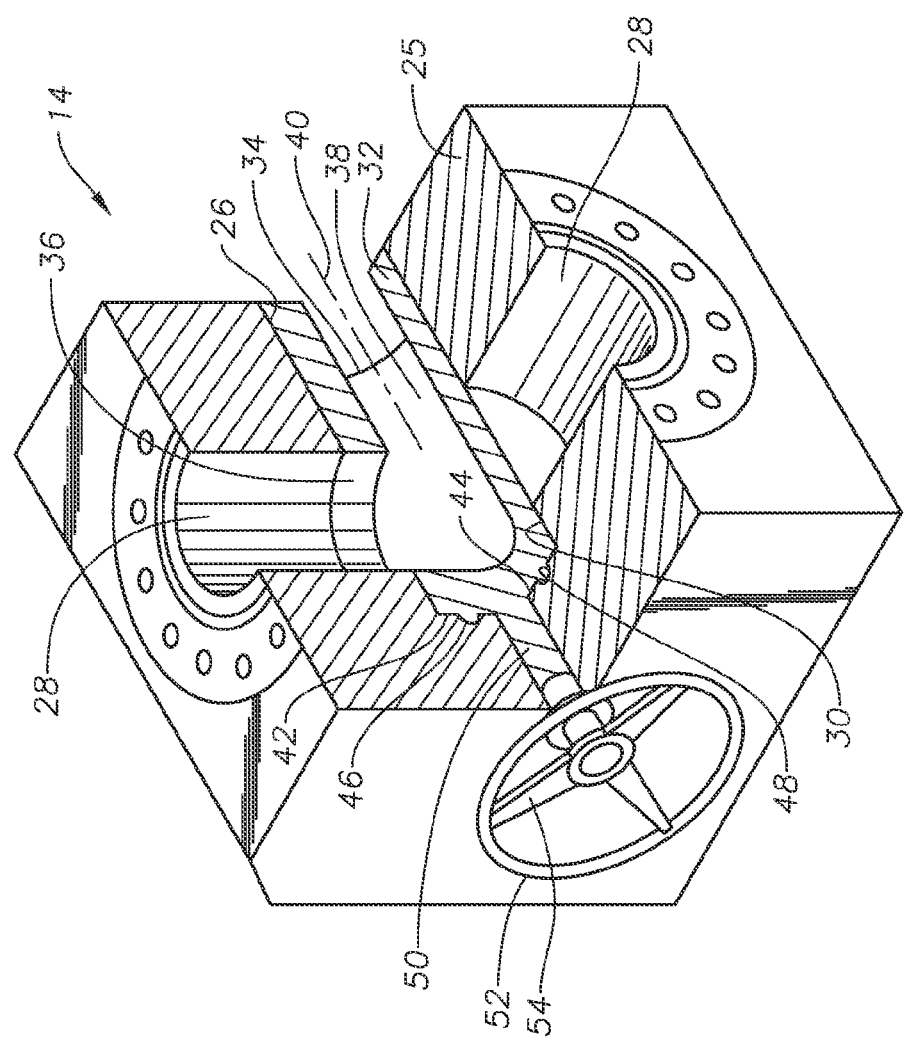
FIG. 5 is a quarter sectional view of a selector valve in accordance with an embodiment of this disclosure.

Turning to FIG. 5, selector valve 14 has block body 25. Block body 25 has block inlet 26 and a plurality of block outlets 28. Block inlet 26 is part of selector valve source 16 and each block outlet 28 is part of a selector valve exit 18. Block body 25 also includes central cavity 30. Block inlet 26 and block outlets 28 extend from central cavity 30 through the sidewall of block body 25 to an exterior surface of block body 25. Block body 25 can have the same number of block outlets 28 as there are selector valve exits 18.

Selector valve 14 also includes selector plug 32. Selector plug 32 is located within central cavity 30 of block body 25. Selector plug 32 includes plug inlet 34 and plug outlet 36. Plug bore 38 extends from plug inlet 34 and plug outlet 36. Plug inlet 34 is aligned with block inlet 26 along central axis 40. Selector plug 32 is moveable so that plug outlet 36 can be aligned with one of the block outlets 28. Selector plug 32 can be, for example, rotatable around central axis 40. Selector plug 32 can have an outer surface that is generally symmetrical about central axis 40. The shape of the outer surface of selector plug 32 can correspond to the shape of the inner surface of central cavity 30. In the example of FIGS. 3 and 5, the outer surface of selector plug 32 can be generally cylindrical. In the example of FIG. 4, the outer surface of selector plug 32 can comprise a series of cylinders and cones shapes. In yet other alternate embodiments, the outer surface of selector plug 32 can include partial spheres (not shown), or other appropriate shape. In alternate embodiments, selector plug 32 could move linearly along central axis 40 to align plug outlet 36 with a block outlet 28. In such an embodiment, the shape of the outer surface of selector plug 32 can be asymmetrical about central axis 40 and include portions that are cylindrical, conical, partially spherical or have other shapes.

In certain embodiments, plug outlet 36 can sealingly engage one of the block outlets 28. In such an embodiment, the sealing engagement of plug outlet 36 with block outlet 28 will provide a sealed fluid flow path from block inlet 26 to block outlet 28. Fluids will therefore be prevented from reaching the other block outlets 28 and hydraulic fracturing system 10 can exclude outlet valves 20. Fluid is impeded from communicating with each of the other block outlets 28 unless and until selector plug 32 is moved linearly or rotated so that plug outlet 36 at least partially aligns with one of such other block outlets 28.

In alternate embodiments, plug outlet 36 can direct fluids into one of the block outlets 28, but lesser amounts of the fluids might also escape in the other block outlets 28 at a lesser or minimal pressure. In such an embodiment, outlet valves 20 associated with such other block outlets 28 can be in the closed position to prevent fluids from reaching the wellheads in fluid communication with such other block outlets. Although the outlet valves 20 that are in the closed position would experience some amount of fluid pressure, such pressure would be significantly less than the pressure exerted on gate valves that are closed against the full pressure of the fluid flow.

Plug inlet 34 and block inlet 26 can be coaxial with central axis 40. Plug outlet 36 and block outlet 28 can be angled relative to central axis 40. Plug inlet 34 and block inlet 26 can pass through an outer surface of selector plug 32 and block body 25, respectively, that are perpendicular to central axis 40. Plug outlet 36 and each of the block outlets 28 can pass through an outer surface of selector plug 32 and block body 25, respectively, that are not perpendicular to central axis 40. In the example of FIGS. 3-5, the outer surface or faces of block body 25 where selector valve exits 18 are located are not in planes that are parallel to the outer surface or faces of block body 25 where selector valve source 16 is located. This orientation will allow selector valve source 16 to be located on one side of block body 25 and the opposite side of block body 25 to be free of selector valve exits 18 so that a stem member 50 can be located collinearly along central axis 40 on such opposite side of block body 25 to rotate selector plug 32 about central axis 40, relative to block body 25, as will be discussed below.

Plug bore 38 can have a directing feature such as, for example, a curve or bend, so that a portion of plug bore 38 can be angled relative to central axis 40. In certain embodiments, plug outlet 36 and each block outlet 28 can be perpendicular to central axis 40 (FIG. 5). In alternate embodiments, plug outlet 36 and each block outlet 28 can have a direction of less than 90 degrees relative to central axis 40 (FIGS. 3-4). As the fluid flows through plug bore 38, the fluid will generate an axial force on selector plug 32, moving selector plug 32 into stable engagement with central cavity 30 of block body 25. Such stable engagement, can restrict rotational movement of selector plug 32 relative to block body 25.

Looking at FIG. 5, the force of the fluid on the portion of plug bore 38 that is angled relative to central axis 40 can cause selector plug 32 to move axially within central cavity 30 until plug annular shoulder 42 mates with hub shoulder 44. Plug annular shoulder 42 is located on an outer surface of selector plug 32 and can have a surface that is perpendicular to central axis 40 or that is angled relative to central axis 40. Hub shoulder 44 is an annular shoulder that is located in central cavity 30 of block body 25. The interaction of plug annular shoulder 42 and hub shoulder 44 can restrict rotational movement of selector plug 32 relative to block body 25.

In order to further restrict, or prevent, rotational movement of selector plug 32 relative to block body 25 when plug outlet 36 aligns with one of the block outlets 28, a locking mechanism can be included in selector valve 14. Looking at FIG. 5, as an example, the locking mechanism can include bumps 46 on plug annular shoulder 42. Bumps 46 can align with divots 48 in hub shoulder 44 when plug outlet 36 aligns with one of the block outlets 28. When the fluid generates an axial force on selector plug 32 by acting on the portion of plug bore 38 that angled relative to central axis 40, bumps 46 will engage divots 48 and prevent rotational movement of selector plug 32 relative to block body 25.

Looking at FIG. 4, plug bore 38 can include a washout reducer 49. Washout reducer 49 will help to prevent the deterioration of plug bore 38, in particular at the portion of plug bore 38 that is angled relative to central axis 40. Washout reducer 49 can include, for example, cladding, a ceramic insert, an ablative coating, guide vanes. A cladding, insert or coating could resist damage from abrasive, caustic, or other fluids that travel at high pressure through plug bore 38. Guide vanes can induce vortices in the fluid passing through plug bore 38 to help redirect fluid forces from impinging on the inner surfaces of plug bore 38. Washout reducer 49 can cover the entire inner surface of plug bore 38, as shown in FIG. 4. In alternate embodiments, washout reducer 49 can cover only a portion of plug bore 38, such as a region in and around the angle or bend of plug bore 38.

Looking at FIG. 5, selector valve 14 can further include stem member 50. Stem member 50 is coupled to selector plug 32. Stem member 50 is moveable to selectively rotate or linearly move selector plug 32 within central cavity 30 of block body 25 so that plug outlet 36 aligns with one of the plurality of block outlets 28. Hand wheel 52 can be attached to stem member 50 in order to rotate stem member 50.

Visual indicator 54 can also be associated with stem member 50 and can be used to determine the direction of plug outlet 36 within central cavity 30. In the example of FIG. 5, visual indicator 54 is a marking on hand wheel 52. As hand wheel 52 is rotated, selector plug 32 is rotated and visual indicator 54 can be positioned on hand wheel 52 so that the rotation of visual indicator 54 tracks the rotation of plug outlet 36. In alternative embodiments, another type of linear or rotational actuation means can be used, such as an automated system for moving selector plug 32 and for determining the location of plug outlet 36.

In an example of operation, each of the selector valve exits 18 can be placed in fluid communication with a wellhead assembly that is located over a subterranean well. Selector valve source 16 can be connected to a fluid pumping system. Stem member 50 can be used to rotate selector plug 32 within block body 25 so that plug outlet 36 aligns with one of the plurality of block outlets 28, providing a fluid flow path from block inlet 26 to such one of the plurality of block outlets 28, and so that fluid communication from block inlet 26 to the others of the plurality of block outlets 28 is impeded. Visual indicator 54 can be used to determine the direction of plug outlet 36.

The flow of fluid into selector valve 14 can be started. When the fluid flows through plug bore 38, the force of the fluids will move selector plug 32 into stable engagement with block body 25 to restrict relative rotational movement between selector plug 32 and block body 25. The flow of fluids through plug bore 38 can move selector plug 32 into stable engagement with block body 25 by moving selector plug 32 axially until plug annular shoulder 42 mates with hub shoulder 44. A locking mechanism, such as bumps 46 engaging divots 48 can further prevent relative rotational movement between selector plug 32 and block body 25 when plug outlet 36 aligns with one of the plurality of block outlets 28.

Selector valve 14 can be used in high pressure application, such as, for example, a hydraulic fracturing system of multiple wells, where fluid pressures can reach tens of thousands of psi. When used for hydraulic fracturing operations, selector valve 14 allows for a selected well to undergo hydraulic fracturing operations, while different operations can occur on other wells that are also in fluid communication with selector valve 14. Selector valve 14 accomplishes this by selecting which one of the plurality of selector valve exits 18 is in fluid communication with selector valve source 16, allowing for fluid flow and pressure from the fracturing pump system access to the well associated with the selected selector valve exit 18 while the other wells are sealed from such pressure and fluid.

While the hydraulic fracturing operations are being undertaken, selector valve 14 can be locked out and tagged to prevent movement of selector plug 32 towards a different selector valve exit 18. This increases the safety of selector valve 14 compared to some current hydraulic fracturing systems. Embodiments of this disclosure utilize selector plug 32 to select which well is chosen, instead of simply blocking the paths by shutting a series of valves. The ability of selector valve 104 to select one of multiple wells from a single location facilitates the use of automated systems.

Embodiments of this disclosure can maintain the advantages of traditional fracturing manifolds of allowing hydraulic fracturing operations to be run in one of the wells parallel with other operations on the other wells without disconnecting the fracturing equipment. Selector valve 14 also provides a single point of connection to the fracturing pumping system while providing fluid flow control and shut down capabilities. Embodiments of the current disclosure are advantageous in that they significantly decrease the number of valves compared to traditional fracturing manifolds. This reduces the number of potential fluid leak paths, providing a safer alternative over the traditional fracturing manifold. This also leads to decreased maintenance requirements, as well as decreasing the footprint and the weight of the required equipment, which is particularly useful considering that such equipment is used on a job site for a period of time before being shipped to multiple other job sites to be used again. Therefore there will be decreased transportation costs by using the lighter and smaller embodiments of this disclosure compared to the traditional fracturing manifold. Embodiments of the current disclosure also provide for simpler visual indication of the direction of flow of the fluids through the system.

The terms "vertical", "horizontal", "upward", "downward", "above", and "below" and similar spatial relation terminology are used herein only for convenience because elements of the current disclosure may be installed in various relative positions.

The system and method described herein, therefore, are well adapted to carry out the objects and attain the ends and advantages mentioned, as well as others inherent therein. While a presently preferred embodiment of the system and method has been given for purposes of disclosure, numerous changes exist in the details of procedures for accomplishing the desired results. These and other similar modifications will readily suggest themselves to those skilled in the art, and are intended to be encompassed within the spirit of the system and method disclosed herein and the scope of the appended claims.

What is claimed is:

1. An apparatus for directing a fluid from an inlet to one of a plurality of outlets that are associated with a wellhead assembly, the apparatus comprising:
   a block body, the block body having a block inlet and a plurality of block outlets;
      a selector plug located within the block body, the selector plug having a plug inlet aligned with the block inlet along a central axis, a plug outlet, and a plug bore extending from the plug inlet to the plug outlet, the plug outlet being at an angle relative to the central axis;
      a stem member coupled to the selector plug, the stem member being moveable to selectively rotate the selector plug within the block body so that the plug outlet aligns with one of the plurality of block outlets, providing a fluid flow path from the block inlet to such one of the plurality of block outlets, and impeding fluid communication from the block inlet to the others of the plurality of block outlets; and
      a plurality of outlet valves, each in fluid communication with one of the plurality of block outlets.

2. The apparatus according to claim 1, wherein the plug outlet sealingly engages the one of the plurality of block outlets, providing a sealed fluid flow path from the block inlet to the one of the plurality of block outlets.

3. The apparatus according to claim 1, further comprising a visual indicator associated with the stem member, the visual indicator identifying the direction of the plug outlet.

4. The apparatus according to claim 1, wherein a portion of the plug bore is angled relative to the central axis so that the fluid flowing through the plug bore will generate an axial force on the selector plug, moving the selector plug into stable engagement with the block body, wherein when in stable engagement, the selector plug is rotationally restricted relative to the block body.

5. The apparatus according to claim 1, wherein an outer surface of the plug bore is symmetrical about the central axis.

6. The apparatus according to claim 1, further comprising a locking mechanism preventing relative rotational movement between the selector plug and the block body when the plug outlet aligns with one of the plurality of block outlets.

7. An apparatus for directing a fluid from an inlet to one of a plurality of outlets that are associated with a wellhead assembly, the apparatus comprising:
   a block body having a central cavity and a sidewall, the block body also having a plurality of block outlets extending from the central cavity through the sidewall, and a block inlet extending to the central cavity;
   a selector plug located within the central cavity, the selector plug having a plug inlet aligned with the block inlet along a central axis, a plug outlet, and a plug bore extending from the plug inlet to the plug outlet, the selector plug being rotatable within the central cavity so that the plug outlet aligns with one of the plurality of block outlets;
   a plurality of outlet valves, each in fluid communication with one of the plurality of block outlets; and
   wherein when the fluid flows from the plug inlet to the one of the plurality of block outlets, the selector plug is rotationally restricted relative to the block body.

8. The apparatus according to claim 7, wherein a portion of the plug bore is angled relative to the central axis so that the fluid flowing through the plug bore will generate an axial force on the selector plug, moving the selector plug into stable engagement with the block body, wherein when in stable engagement, the selector plug is rotationally restricted relative to the block body.

9. The apparatus according to claim 7, further comprising a stem member coupled to the selector plug, the stem member moveable to selectively rotate the selector plug within the central cavity.

10. The apparatus according to claim 7, wherein when the plug outlet aligns with one of the plurality of block outlets the plug bore provides a fluid flow path from the block inlet to the one of the plurality of block outlets, and the fluid is impeded from communicating with the others of the plurality of block outlets.

11. The apparatus according to claim 7, wherein the plug outlet sealingly engages the one of the plurality of block outlets, providing a sealed fluid flow path from the block inlet to the one of the plurality of block outlets.

12. The apparatus according to claim 7, wherein each outlet valve is in a closed position.

13. A method for directing a fluid from an inlet to one of a plurality of outlets that are associated with a wellhead assembly, the method comprising:
   locating a selector plug within a block body of a selector valve, the block body having a block inlet and a plurality of block outlets and the selector plug having a plug inlet aligned with the block inlet, a plug outlet, a plurality of outlet valves, each in fluid communication with one of the plurality of block outlets, and a plug bore extending from the plug inlet to the plug outlet, the plug outlet being angled relative to the plug inlet; and
   rotating a stem member coupled to the selector plug to rotate the selector plug within the block body so that the plug outlet aligns with one of the plurality of block outlets, providing a fluid flow path from the block inlet to such one of the plurality of block outlets, and impeding fluid communication from the block inlet to the others of the plurality of block outlets.

14. The method according to claim 13, further comprising providing a sealed fluid flow path from the block inlet to the one of the plurality of block outlets by sealingly engaging the one of the plurality of block outlets with the plug outlet.

15. The method according to claim 13, the method further comprising limiting the flow of fluid through one or more of the plurality of block outlets with the plurality of outlet valves.

16. The method according to claim 13, further comprising determining the direction of the plug outlet with a visual indicator associated with the stem member.

17. The method according to claim 13, wherein a portion of the plug bore is angled relative to the central axis so that the fluid flowing through the plug flows at an angle relative to the central axis, the method further comprising moving the selector plug into stable engagement with the block body to restrict relative rotational movement between the selector plug and the block body by generating an axial force on the selector plug with the fluid flowing through the plug bore.

18. The method according to claim 17, wherein the selector plug has a plug annular shoulder on an outer surface of the selector plug, and wherein the step of moving the selector plug into stable engagement with the block body comprises moving the selector plug until the plug annular shoulder mates with a hub shoulder on an inner cavity of the block body.

19. The method according to claim 13 further comprising preventing relative rotational movement between the selector plug and the block body when the plug outlet aligns with one of the plurality of block outlets, with a locking mechanism.

20. The method of claim 19, wherein the locking mechanism comprises bumps or divots on the selector plug configured to align and mate with divots or bumps, respectively, on an inner cavity of the block body.

* * * * *